United States Patent
Kim

(12) 
(10) Patent No.: US 8,851,838 B2
(45) Date of Patent: Oct. 7, 2014

(54) DISPLAYABLE WIND TURBINE

(75) Inventor: Seung Jo Kim, Seoul (KR)

(73) Assignee: Snu R&DB Foundation, Seoul (KR)

( * ) Notice: Subject to any disclaimer, the term of this patent is extended or adjusted under 35 U.S.C. 154(b) by 768 days.

(21) Appl. No.: 13/140,630

(22) PCT Filed: Feb. 20, 2009

(86) PCT No.: PCT/KR2009/000817
§ 371 (c)(1),
(2), (4) Date: Aug. 30, 2011

(87) PCT Pub. No.: WO2010/071261
PCT Pub. Date: Jun. 24, 2010

(65) Prior Publication Data
US 2011/0305569 A1 Dec. 15, 2011

(30) Foreign Application Priority Data
Dec. 18, 2008 (KR) .................. 10-2008-0129112

(51) Int. Cl.
*F03D 7/06* (2006.01)
*F03D 3/06* (2006.01)

(52) U.S. Cl.
CPC .............. *F03D 3/068* (2013.01); *Y02E 10/74* (2013.01); *F05B 2240/214* (2013.01); *F03D 7/06* (2013.01); *F05B 2270/328* (2013.01); *F05B 2220/25* (2013.01)
USPC ............... 416/5; 415/4.2; 416/41; 416/147

(58) Field of Classification Search
USPC ............... 415/4.2; 416/5, 37, 41, 54, 62, 147, 416/168 R
See application file for complete search history.

(56) References Cited

U.S. PATENT DOCUMENTS

2007/0177970 A1* 8/2007 Yokoi .................. 415/4.2

FOREIGN PATENT DOCUMENTS

| JP | 2003-184728 A | 7/2003 |
| JP | 2004-293409 A | 10/2004 |
| JP | 2006-307815 A | 11/2006 |
| KR | 10-2004-0028314 A | 4/2004 |

OTHER PUBLICATIONS

JP 2003184728, Hori Junya, Jul. 3, 2003.*

* cited by examiner

*Primary Examiner* — Edward Look
*Assistant Examiner* — Maxime Adjagbe
(74) *Attorney, Agent, or Firm* — Rabin & Berdo, P.C.

(57) ABSTRACT

The present invention relates to a displayable wind turbine. The displayable wind turbine includes a central shaft arranged vertically to a flow direction of fluid. Radially extending upper spokes are coupled to an upper hub. Radially extending lower spokes are coupled to a lower hub. Blades have first ends connected to an end of the upper hub and second ends connected to an end of the lower hub. A pitch control unit adjusts a blade pitch angle. A detection unit includes a fluid direction detection unit, a fluid velocity detection unit, a central shaft speed detection unit, and a central shaft position detection unit. A light emitting unit includes a printed circuit board and light emitting devices. A control unit controls operations of the pitch control unit and the light emitting unit.

21 Claims, 7 Drawing Sheets

140,240

DISPLAYABLE WIND TURBINE

TECHNICAL FIELD

The present invention relates, in general, to a wind turbine, and, more particularly, to a displayable wind turbine, which has a display function and automatically changes the pitch angle of blades depending on the flow direction and flow velocity of fluid.

BACKGROUND ART

A wind turbine, which is a power generation device for converting wind energy into electric energy, allows blades to be rotated by the wind and produces electricity by way of the rotary power of the blades generated by the rotation.

Such a wind turbine is mainly composed of blades, a gearbox and an electric generator.

The blades are parts rotated by wind to convert wind power energy into mechanical energy. The gearbox is a device for rotating the electric generator by transmitting rotary power generated at the blades to a change gear through a central shaft and increasing the number of rotations to a number required by the electric generator. The electric generator is a device for converting the mechanical energy generated at the blades into electric energy.

Conventional wind turbines are classified into a horizontal axis wind turbine in which a central shaft is installed horizontally to the flow direction of fluid on the basis of the direction of the installation of a shaft, and a vertical axis wind turbine in which a central shaft is installed vertically to the flow direction of fluid on the basis of the shaft installation direction.

The horizontal axis wind turbine is operated in a propeller-rotation manner and has relatively high power generation efficiency, but is disadvantageous in that the direction of a rotor must be changed depending on variation in the flow direction of fluid, and a device for changing the angle of blades depending on the flow velocity of fluid is required.

Here, the term "rotor" means a rotating body including a plurality of blades combined with each other around a central shaft.

Further, the horizontal axis wind turbine is configured such that the central shaft of the rotor is located above at least the radius of the rotor. Accordingly, in order to connect the central shaft of the rotor, located at a higher place, to an electric generator, the horizontal axis wind turbine can be driven only when the shaft of the electric generator and the central shaft of the rotor are arranged at almost the same position by installing the electric generator at the same height as that of the central shaft, or when a device for converting horizontal rotary power into vertical rotary power is additionally installed and is connected to the electric generator. However, the former is problematic in that the risk of causing mechanical damage is present due to the strong flow of fluid, and maintenance is not facilitated. Further, the latter is problematic in that, during a process for converting horizontal rotary power into vertical rotary power, energy loss may occur.

Further, recently, a vertical axis wind turbine has been developed and commercialized, but is problematic in that manufacturing costs are high, repelling power resistant to wind power is produced at blades moving in the reverse direction of wind, and thus rotary power obtained from blades moving in the forward direction of wind is canceled and weakened. Further, when a wind turbine is manufactured to have a large size, a load on a rotating part itself (an entire part rotated by fluid) is very large, so that the effectiveness of power generation is low, and the rotating part does not rotate when fluid flows at low velocity.

Meanwhile, a conventional vertical axis wind turbine includes a central shaft located vertically to the flow direction of fluid and configured to transmit electric power to an electric generator, an upper hub arranged on the top of the central shaft and configured such that a plurality of upper spokes is radially coupled to the upper hub, a lower hub arranged on the bottom of the central shaft and configured such that a plurality of lower spokes is radially coupled to the lower hub, and a plurality of blades, the first ends of which are fixed to the upper spokes of the upper hub and the second ends of which are fixed to the lower spokes of the lower hub.

However, the conventional vertical axis wind turbine is disadvantageous in that, when the flow direction of fluid is not uniform and is fluctuating, the efficiency of energy produced in the vertical axis wind turbine decreases. In other words, since the blades are fixed, the blades cannot maintain an optimized pitch angle with respect to the fluctuating flow direction of fluid.

DISCLOSURE OF INVENTION

Technical Problem

Accordingly, the present invention has been made keeping in mind the above problems occurring in the prior art, and an object of the present invention is to provide a displayable wind turbine, in which the pitch angle of blades can be automatically adjusted depending on the flow direction of fluid.

Another object of the present invention is to provide a displayable wind turbine, which can display an image such as a picture or a moving image on the blade surfaces of blades.

Technical Solution

A displayable wind turbine according to the present invention comprises a central shaft arranged vertically to a flow direction of fluid to transmit rotary power to an electric generator; an upper hub provided on a top of the central shaft and configured such that a plurality of radially extending upper spokes is coupled to the upper hub; a lower hub provided on a bottom of the central shaft and configured such that a plurality of radially extending lower spokes is coupled to the lower hub; a plurality of blades, first ends of which are rotatably connected to an end portion of the upper hub and second ends of which are rotatably connected to an end portion of the lower hub; a pitch control unit configured to adjust a pitch angle of the blades by horizontally rotating the blades; a detection unit including a fluid direction detection unit for detecting a flow direction of the fluid, a fluid velocity detection unit for detecting a flow velocity of the fluid, a central shaft speed detection unit for detecting a rotational speed of the central shaft, and a central shaft position detection unit for detecting a rotating position of the central shaft; a light emitting unit including a printed circuit board provided on one blade surface of each of the blades and a plurality of light emitting devices mounted on a top surface of the printed circuit board; and a control unit configured to control operations of the pitch control unit and the light emitting unit and to individually turn on or off the light emitting devices depending on variation in the rotational speed of the central shaft and the pitch angle of the blades.

Preferably, the pitch control unit may comprise a plurality of connection elements, first ends of which are connected to a fastening part installed to be spaced apart from a shaft of each of the blades in a width direction of the blade by a predetermined distance (d), a rotating body connected to second ends of the plurality of connection elements and configured to be rotated together with the upper hub around a center of the central shaft as a reference location, a guiding part for linearly guiding the rotating body, and a direction switching part configured to vary a magnitude of the pitch angle of the blades in a shape of a sine wave through the connection elements connected to the rotating body by translating and rotating the center of the rotating body from the reference location, thus rotating the guiding part.

Preferably, the displayable wind turbine may further comprise driving means configured to drive the pitch control unit and provided with an operation unit for supplying activation force to the pitch control unit on a basis of information detected by the detection unit.

Preferably, each of the plurality of light emitting devices may be configured such that a R(Red) light emitting device, a G(Green) light emitting device and a B(Blue) light emitting device constitute a single pixel, and the R, G and B light emitting devices are operated to adjust luminance or to be turned on or off according to variation in a magnitude of input voltage.

Preferably, the displayable wind turbine may further comprise a data storage unit for storing image data to be displayed on blade surfaces of the blades, wherein the control unit receives the image data from the data storage unit, and individually turns on or off the light emitting devices by synchronizing information about the rotational speed of the central shaft, information about the pitch angle of the blades and the image data with each other.

Preferably, the blades may be configured such that both ends thereof are formed to be open.

Preferably, the displayable wind turbine may further comprise a cooling part provided in each of the blades and configured to cool the light emitting unit heated by repeated turning on/off operations of the light emitting devices.

In addition, a displayable wind turbine according to the present invention comprises a central shaft arranged vertically to a flow direction of fluid to transmit rotary power to an electric generator; an upper hub provided on a top of the central shaft and configured such that a plurality of radially extending upper spokes is coupled to the upper hub; a lower hub provided on a bottom of the central shaft and configured such that a plurality of radially extending lower spokes is coupled to the lower hub; a plurality of blades, first ends of which are rotatably connected to an end portion of the upper hub and second ends of which are rotatably connected to an end portion of the lower hub; a pitch control unit configured to adjust a pitch angle of the blades by horizontally rotating the blades; a data storage unit configured to store optimal pitch angles of the blades; a detection unit including a fluid direction detection unit for detecting a flow direction of the fluid, a fluid velocity detection unit for detecting a flow velocity of the fluid, a central shaft speed detection unit for detecting a rotational speed of the central shaft, and a central shaft position detection unit for detecting a rotating position of the central shaft; a light emitting unit including a printed circuit board provided on one blade surface of each of the blades and a plurality of light emitting devices mounted on a top surface of the printed circuit board; and a control unit configured to receive the optimal pitch angles of the blades stored in the data storage unit, to operate the pitch control unit so that the blades are located at the optimal pitch angles, and to individually turn on or off the light emitting devices depending on variation in the rotational speed of the central shaft and the pitch angle of the blades.

Preferably, the pitch control unit may comprise a servo motor located at an end of the upper hub and configured to be rotated under control of the control unit; a servo motor gear connected to a shaft of the servo motor; and a blade gear connected to a shaft of each blade and engaged with the servo motor gear, wherein the pitch angle of the blades is adjusted in such a way that the blade gear is rotated together with rotation of the servo motor.

Preferably, the data storage unit may store image data to be displayed on blade surfaces of the blades, and the control unit receives the image data from the data storage unit, and individually turns on or off the light emitting devices by synchronizing information about the rotational speed of the central shaft, information about the pitch angle of the blades and the image data with each other.

Preferably, each of the plurality of light emitting devices may be configured such that a R(Red) light emitting device, a G(Green) light emitting device and a B(Blue) light emitting device constitute a single pixel, and the R, G and B light emitting devices are operated to adjust luminance or to be turned on or off according to variation in a magnitude of input voltage.

Preferably, the blades may be configured such that both ends thereof are formed to be open.

Preferably, the displayable wind turbine may further comprise a cooling part provided in each of the blades and configured to cool the light emitting unit heated by repeated turning on/off operations of the light emitting devices.

Advantageous Effects

The displayable wind turbine according to the present invention is advantageous in that, since the pitch angle of blades can be automatically adjusted depending on the flow direction and flow velocity of fluid, optimal energy conversion efficiency can be obtained even if the direction and velocity of flowing fluid are changed.

Further, the present invention is advantageous in that blade pitch angles, which enable optimal energy conversion efficiency corresponding to the flow of various types of fluid to be obtained, can be easily calculated.

Further, LEDs, provided on the blade surfaces of the blades of the displayable wind turbine, are turned on/off, so that an image such as a picture or a moving image can be displayed according to the afterimage effects of persons, thus realizing advertising effects.

Further, the present invention is advantageous in that, since LEDs are turned on or off or an image, such as a picture or a moving image, can be displayed using electric energy produced by the displayable wind turbine without requiring a separate power supply, energy consumption can be reduced.

Further, blades made of composite material having an excellent weight versus stiffness ratio are used, thus providing structural stability.

In addition, when the flow of fluid does not occur, an image such as a picture or a moving image can be displayed by rotating blades using a storage battery, thus continuously maintaining advertising effects regardless of the existence of fluid.

BEST MODE FOR CARRYING OUT THE INVENTION

Figure 1:
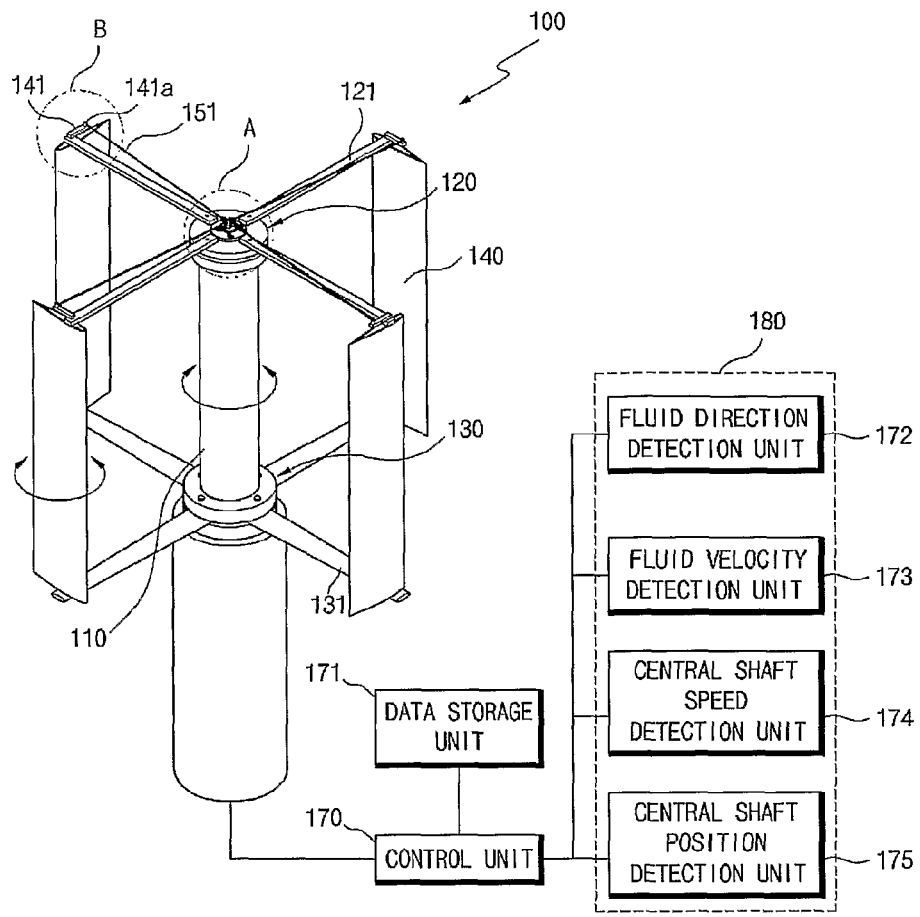
FIG. 1 is a perspective view showing the construction of a wind turbine according to a first embodiment of the present invention.

Hereinafter, embodiments of the present invention will be described in detail with reference to the attached drawings. Prior to giving the description, the terms and words used in the present specification and claims should not be interpreted as being limited to their typical meanings or dictionary definitions thereof, but should be interpreted as having meanings and concepts corresponding to the technical spirit of the present invention on the basis of the principle by which the inventor can suitably define the implications of terms in the way which best describes the invention.

Therefore, the construction described in the present specification and shown in the drawings is only a preferred embodiment of the present invention, and is not intended to represent all the technical spirit of the present invention. Accordingly, it should be understood that various equivalents and modifications capable of replacing the above embodiments may exist at the time at which the present invention is filed.

Further, a displayable wind turbine according to the present invention means a wind turbine having a display function. Hereinafter, the displayable wind turbine will be referred to as a 'wind turbine' for convenience of description.

Figure 2:
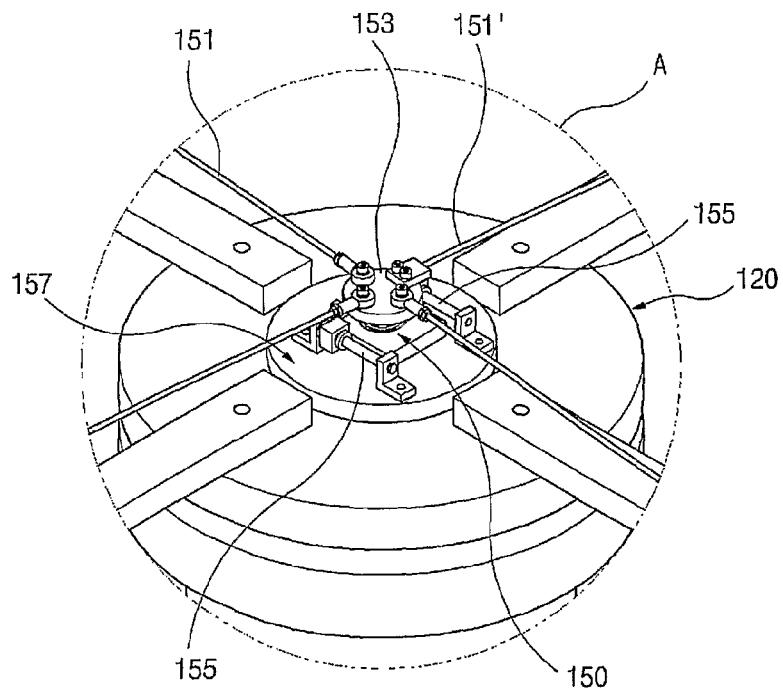
FIG. 2 is an enlarged perspective view of portion 'A' of FIG. 1.
Figure 3:
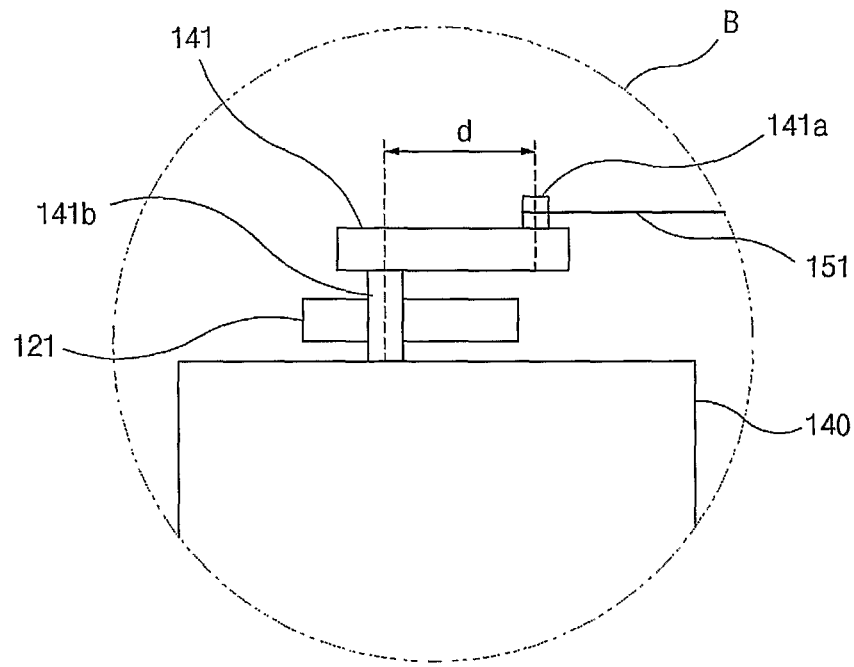
FIG. 3 is an enlarged side view of portion 'B' of FIG. 1.
Figure 4:
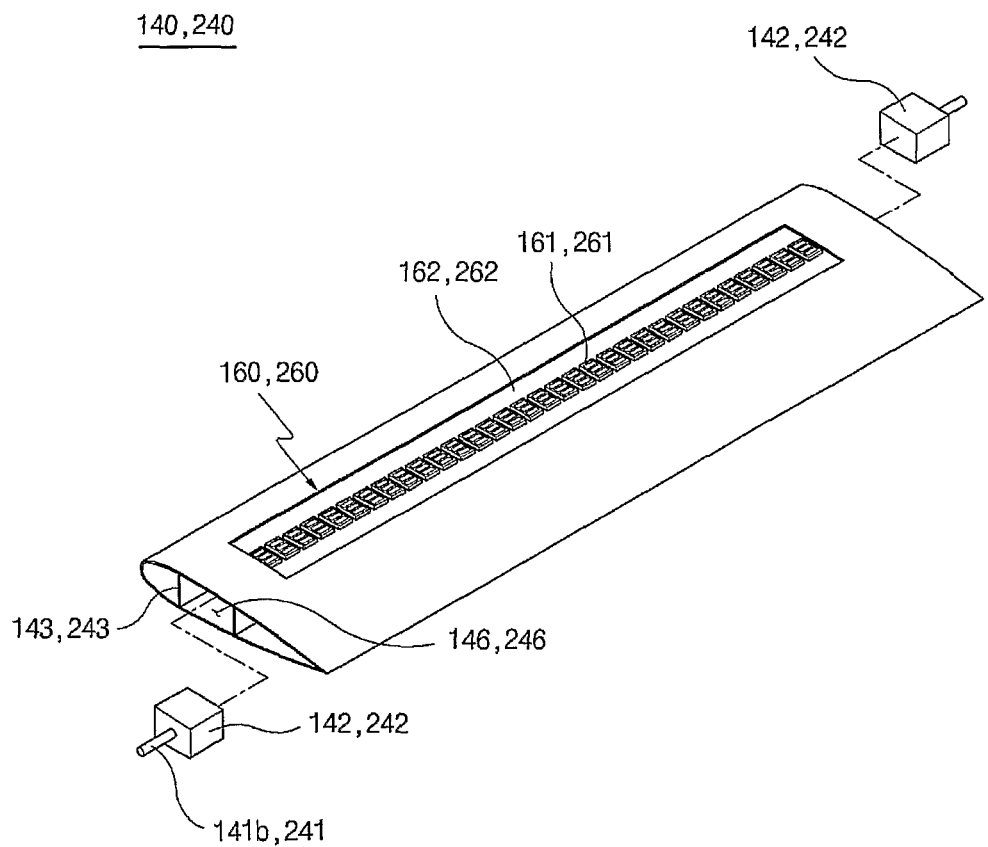
FIG. 4 is a perspective view showing the construction of the blade of a wind turbine according to the present invention.
Figure 5:
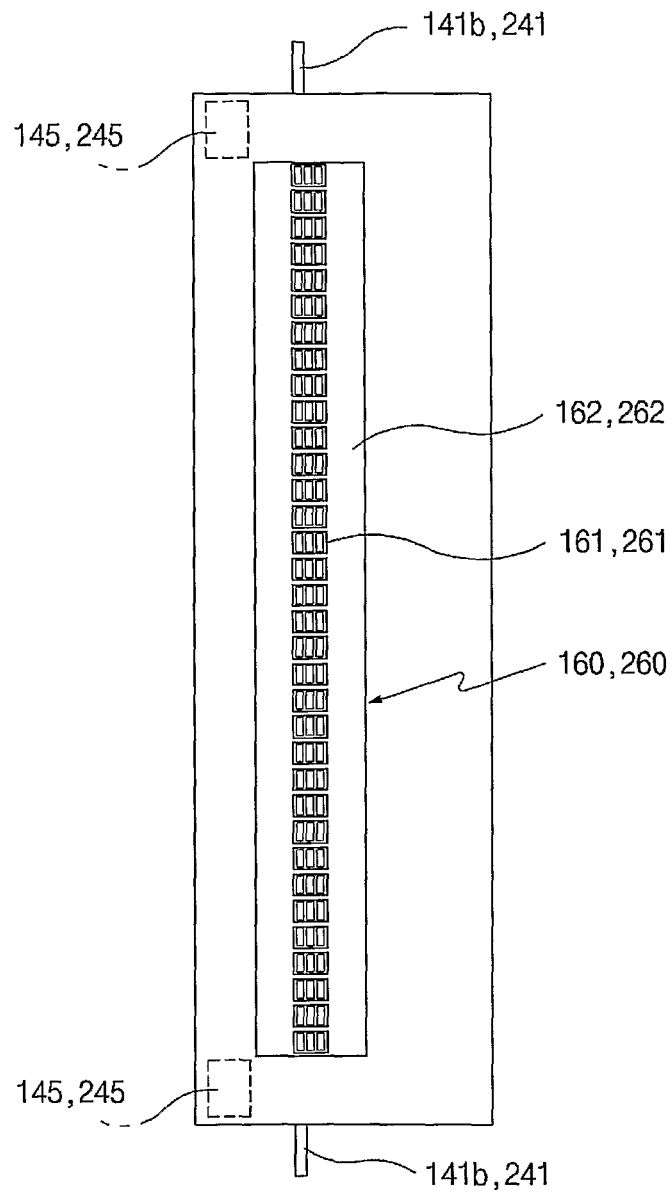
FIG. 5 is a plan view showing the construction of the blade of FIG. 4.
Figure 6:
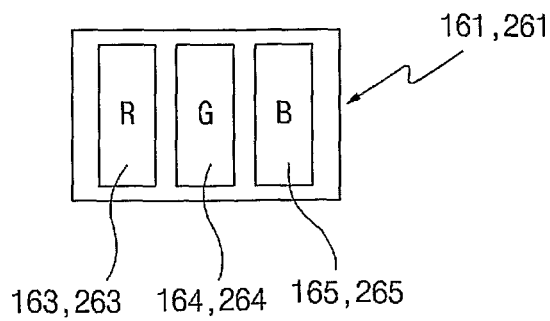
FIG. 6 is a schematic diagram showing the construction of the light emitting unit of the blade of FIG. 4.
Figure 7:
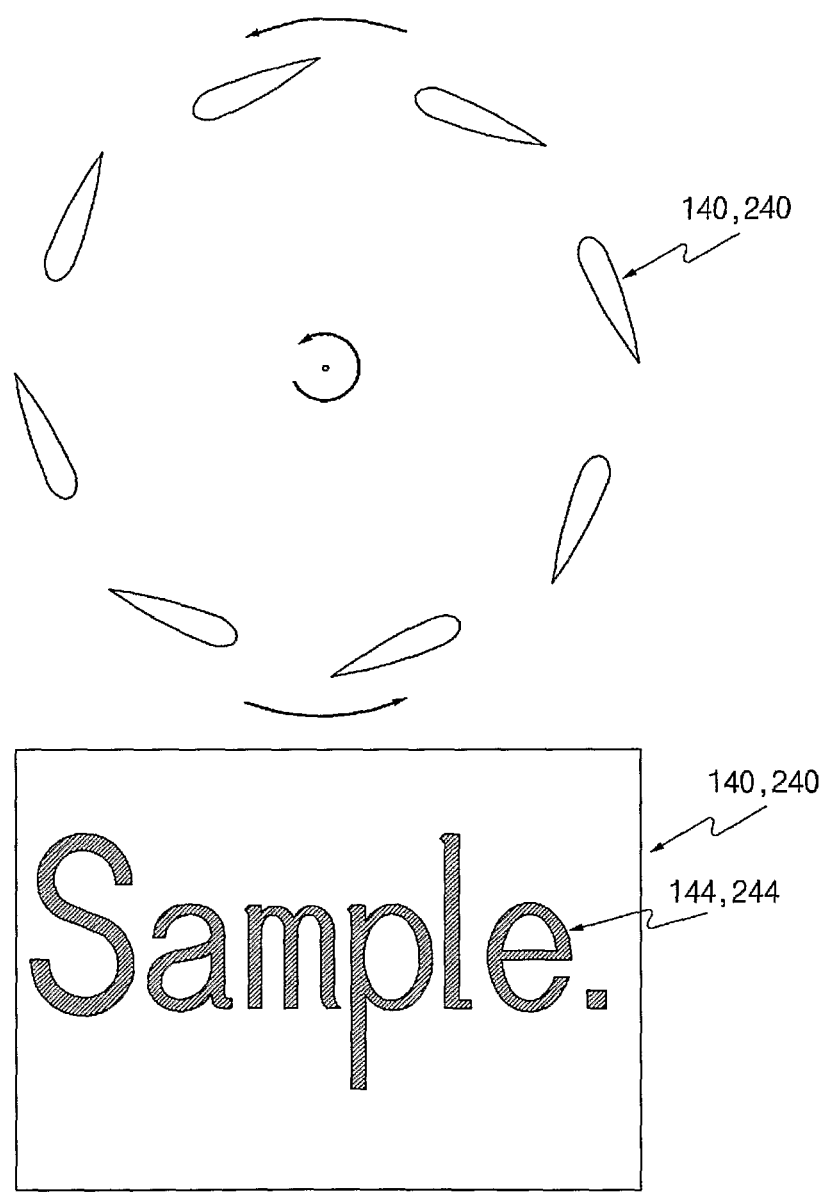
FIG. 7 is a schematic diagram showing the operating principle of the display of an image on the blade surfaces of the blades of a displayable wind turbine according to the present invention.

FIG. 1 is a perspective view showing the construction of a wind turbine according to a first embodiment of the present invention, FIG. 2 is an enlarged perspective view of portion 'A' of FIG. 1, FIG. 3 is an enlarged side view of portion 'B' of FIG. 1, FIG. 4 is a perspective view showing the construction of the blade of a wind turbine according to the present invention, FIG. 5 is a plan view showing the construction of the blade of FIG. 4, FIG. 6 is a schematic diagram showing the construction of the light emitting unit of the blade of FIG. 4, and FIG. 7 is a schematic diagram showing the operating principle of the display of an image on the blade surfaces of the blades of a wind turbine according to the present invention;

The term 'fluid' described in embodiments of the present invention may mean water or air. A wind turbine according to the present invention, which will be described in detail later, may be easily used for water-power generation by using water (including seawater) other than air as fluid and may be easily implemented within the knowledge level of those skilled in the art.

As shown in FIGS. 1 to 7, a wind turbine 100 according to the present invention includes a central shaft 110, an upper hub 120, a lower hub 130, a plurality of blades 140, a pitch control unit 150, a detection unit 180, a light emitting unit 160, and a control unit 170. The central shaft 110 is arranged vertically to the flow direction of fluid and configured to transmit rotary power to an electric generator (not shown). The upper hub 120 is provided on the top of the central shaft 110 and constructed such that a plurality of radially extending upper spokes 121 is coupled to the upper hub 120. The lower hub 130 is provided on the bottom of the central shaft 110 and constructed such that a plurality of radially extending lower spokes 131 is coupled to the lower hub 130. The blades 140 are configured such that the first ends thereof are rotatably connected to an end portion of the upper hub 120 and the second ends thereof are rotatably connected to an end portion of the lower hub 130. The pitch control unit 150 controls the pitch angle of the blades 140 by horizontally rotating the blades 140. The detection unit 180 includes a fluid direction detection unit 172 for detecting the flow direction of fluid, a fluid velocity detection unit 173 for detecting the flow velocity of the fluid, a central shaft speed detection unit 174 for detecting the rotational speed of the central shaft 110, and a central shaft position detection unit 175 for detecting the rotating position of the central shaft 110. The light emitting unit 160 includes a printed circuit board 162 provided in one blade surface of each of the blades 140, and a plurality of light emitting devices 161 mounted on the top surface of the printed circuit board 162. The control unit 170 controls the operations of the pitch control unit 150 and the light emitting unit 160, and individually turns on or off the light emitting devices 161 depending on variation in the rotational speed of the central shaft 110 and the pitch angle of the blades 140.

First, as shown in FIGS. 2 and 3, the pitch control unit 150 includes a plurality of connection elements 151 and 151', a rotating body 153, a guiding part 155, and a direction switching part 157. The connection elements 151 and 151' have first ends which are connected to the shafts 141b of the blades 140 and fastening parts 141a installed to be spaced apart from the shafts 141b of the blades 140 in a width direction by a predetermined distance d. The rotating body 153 is connected to the second ends of the plurality of connection elements 151 and 151', and is rotating together with the upper hub 120, around the center of the central shaft 110 as a reference location. The guiding part 155 linearly guides the rotating body 153. The direction switching part 157 allows the magnitude of the pitch angle of the blades 140 to vary in the shape of a sine wave through the connection elements 151 and 151' connected to the rotating body 153 by translating and rotating the center of the rotating body 153 from the reference location, and rotates the guiding part 155.

The central shaft 110 is arranged vertically to the flow direction of fluid and is configured to transmit rotary power to an electric generator (not shown).

The electric generator may be a typical power generator and may be merely arranged to provide the rotary power provided by the central shaft 110 without especially switching the direction of the rotary power. Further, a power transmission means, such as a gear or a belt, may be used between the electric generator and the central shaft 110, and a typical power cutoff means for preventing an overload of the electric generator may be provided.

The central shaft 110 preferably has a hollow cylindrical shape. The central shaft 110, cylindrically formed in this way, is stable in the structure thereof, and increases rotary power produced by the blades 140 located around the cylinder of the central shaft 110 by increasing the velocity of fluid passing through space around the cylinder of the central shaft 110 with respect to the flow direction of fluid.

Further, the upper hub 120 is provided on the top of the central shaft 110 in a shape in which the plurality of upper spokes 121 extends radially, and the lower hub 130 is provided on the bottom of the central shaft 110 in a shape in which the plurality of lower spokes 131 extends radially.

Since the blades 140 are intended to have periodic variation in pitch angle, they are configured such that the sections thereof are formed in a symmetrical airfoil shape mainly used for the wings of an airplane. Further, the blades 140 are arranged to allow the longitudinal direction thereof to be a vertical direction so that the longitudinal direction and the flow direction of fluid are at about a right angle. Further, lift is generated from the flowing fluid, and thus rotary power is obtained.

Figure 10:
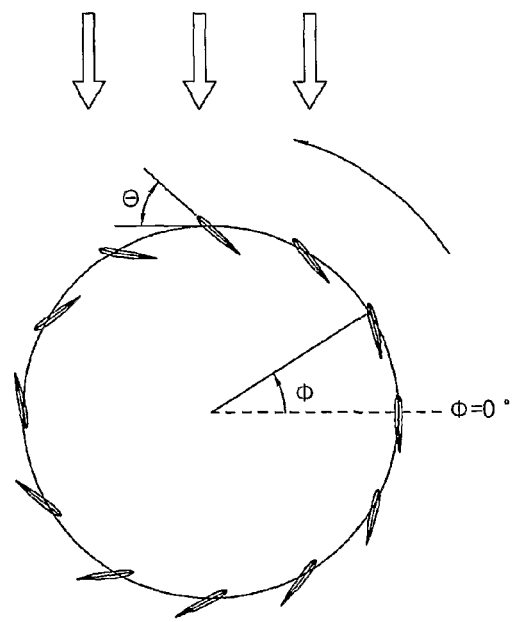
FIG. 10 is a schematic diagram showing a blade pitch angle relative to the flow of fluid according to the present invention.

Here, as shown in FIG. 10, when the width direction of the blades 140 is identical to a tangential direction of a circumference formed by the ends of the upper spokes 121 or the lower spokes 131, the blades 140 are present at a reference location, that is, a location at which variation in pitch angle does not occur. Further, the pitch angle $\theta$ of the blades 140 denotes an angle formed by a solid line, indicating the tangential direction of the circumference in FIG. 10, and the blade surface of each blade 140.

Further, the width of each blade 140 is the length of the airfoil chord of the section of the blade 140, and such a blade 140 is influenced by a load attributable to centrifugal force generated while being rotated. Accordingly, it is preferable to use a blade having both required stiffness and light weight from the standpoint of structural stability and operational efficiency.

Therefore, the blades 140 are preferably manufactured using fibrous composite material having an excellent weight versus stiffness ratio. For example, glass or carbon fiber can be used as the fibrous composite material. The manufacturing of the blades 140 using the fibrous composite material can be implemented using typical technology.

When the fibrous composite material is used, a load applied to the pitch control unit 150 is reduced, and thus structural damage can be prevented and the lifespan of the blades can be increased. Further, each blade 140 must be designed to allow its aerodynamic center and its center of gravity to be adjacent to each other.

When the aerodynamic center is located far away from the center of gravity, a large load is applied to the connection elements 151 and 151' for connecting the blades 140 to the rotating body 153 due to the rotation of the blades 140, and a large driving force is required. Further, the number of blades 140 may vary according to the purpose of the wind turbine 100 or the required power consumption.

The shaft 141b of each blade 140 is connected both to the upper spokes 121 and to the lower spokes 131 so that the blade 140 is rotatable around the shaft 141b in order to enable the pitch angle of the blade 140 to change.

Such a shaft 141b can be connected to the blade 140 in such a way as to be inserted into a hole (not shown) formed in the blade 140. Alternatively, it is also possible to provide the shaft 141b on the blade 140 and to form the hole (not shown) in the upper spokes 121 and the lower spokes 131.

At this time, it is profitable to place the shaft 141b or the hole at the aerodynamic center of the airfoil of the section of the blade 140 in order to prevent the occurrence of damage attributable to unnecessary vibration of the blade 140.

The connection elements 151 and 151' may be typical rods made of material resistant to tensile and compressive forces with which the blade 140 affects them.

The predetermined distance d, which is the distance by which the shaft 141b and the fastening part 141a of the blade 140 are spaced apart from each other, is preferably determined in consideration of the range of variation in the pitch angle of the blade 140 and the range of the operation of the pitch control unit 150.

Further, each of the fastening parts 141a required for the connection of the connection elements 151 and 151' may be provided on the blade 140, but it is preferable to provide the fastening part 141a on the shaft for connecting the blade 140 to the upper spokes 121 or the lower spokes 131 in order to overcome the problems of a manufacturing process and prevent the flow of fluid, flowing through the external surface of the blade 140, from being converted into warm current.

As shown in FIG. 4, both ends of the blade 140 are formed to be open so that both the ends communicate with each other, and the inner surface of the blade 140 is supported by a spar 143, and thus the shape of the blade 140 is maintained.

Further, at one end of the shaft 141b of the blade 140, a shaft support 142, which is inserted into holes 146 formed at both ends of the blade and is configured to couple the blade 140 to the shaft 141b, is formed.

In this way, since both ends of the blade 140 are formed to be open, external air is circulated into the blade 140 through the holes 146, and thus the effect of cooling the light emitting unit 160 heated by the repeated turning on/off operations of the light emitting devices 161 is provided. In addition, since the blade 140 is formed to have an empty inner space, the weight of the blade 140 is reduced, and thus the effect of increasing the rotating efficiency thereof attributable to fluid is provided.

Here, a cooling part (not shown) may be further provided in the blade 140 to cool the light emitting unit 160, heated by the repeated turning on/off operations of the light emitting devices 161, when heat generated by the light emitting unit 160 exceeds a possible level of cooling by external air flowing into the blade through the holes 146.

FIG. 2 is an enlarged view showing portion 'A' of FIG. 1.

Referring to FIG. 2, the connection elements 151 and 151' are connected to the rotating body 153 through a bearing, but it is preferable to fasten the fixed connection element 151', which is the reference of the plurality of connection elements 151 and 151', to the rotating body 153 for mechanical operation.

Since such a fixed connection element 151' is subjected to a relatively larger load than other connection elements 151 when the blades 140 are rotating, it must be more robustly manufactured.

As shown in FIG. 1, the detection unit 180 includes the fluid direction detection unit 172 for detecting the flow direction of fluid, the fluid velocity detection unit 173 for detecting the flow velocity of the fluid, the central shaft speed detection unit 174 for detecting the rotational speed of the central shaft 110, and the central shaft position detection unit 175 for detecting the rotating position of the central shaft 110.

In this case, the rotating position of the central shaft 110 detected by the central shaft position detection unit 175 denotes a position at which a specific point located on the outer circumference of the central shaft 110 is placed when the central shaft 110 is rotating in the case where the specific point is located on the outer circumference of the central shaft 110. That is, it means one position, at which the specific point is placed, among a plurality of positions corresponding to azimuth angles of 360 degrees formed by the outer circumference of the central shaft 110.

Further, the detection unit 180 is equipped with typical sensors having fans to detect the rotational speed and direction of the blades relative to the velocity of fluid, that is, wind, thus detecting the flow velocity and direction of the fluid.

Information about respective results detected by the detection unit 180 is converted into operation signals by an operation unit (not shown), and are then transmitted.

Here, the operation unit functions to drive the pitch control unit 150 such as by supplying activation force to the pitch control unit 150 on the basis of the information detected by the detection unit 180. The operation unit may include a guide operation unit (not shown) connected to the guiding part 155 to translate the pitch control unit 150, and a direction switching operation unit (not shown) connected to the direction switching part 157 to rotate the direction switching part 157.

Further, the direction switching operation unit can be used as a power source through a typical hydraulic or electric motor.

Meanwhile, as shown in FIGS. 4 to 7, the wind turbine 100 according to the first embodiment of the present invention is provided to display an image 144 such as a picture or a moving image on blade surfaces of respective blades 140 depending on the afterimage effects of persons.

In order to implement this display function, the wind turbine 100 further includes the light emitting unit 160 including the printed circuit board 162 provided on one blade surface of each blade 140, and the plurality of light emitting devices 161 mounted on the top surface of the printed circuit board 162. As the light emitting devices 161, typical Light Emitting Diodes (LEDs) may be used.

Generally, human eyes perceive image frames, which repeatedly appear at higher than a certain speed as in the case of a movie, as a continuous object. For example, when a red point moving from location A to location B at a certain speed is turned on and off, a human being's eyes perceive that the red point is continuously turned on in an interval ranging from location A to location B.

Similarly, when the light emitting devices 161 located on the blade surface of the blade 140 which is rotating in a horizontal direction by way of fluid are turned on and off in a certain pattern, it seems that the blade surfaces of respective blades 140 display a predetermined image 144, as shown in FIG. 7.

Here, it is apparent that the number of light emitting devices 161 may vary according to display resolution and the size of the blades 140. Further, in FIGS. 4 and 5, the light emitting devices 161 of the light emitting unit 160 are shown to be arranged in one line, but they are not limited to this arrangement and may be arranged in two or more lines in consideration of the display resolution and the rotational speed of the central shaft 110.

Further, as shown in FIGS. 4 and 5, a plurality of light emitting devices 161 may be provided on one blade surface of the blade 140. In this case, in a portion below the light emitting devices 161, that is, the inner portion of the blade surface of the blade 140 on which the light emitting devices 161 are mounted, voltage supply lines (not shown) required to supply voltage to the light emitting devices 161 and signal transmission lines (not shown) required to control the light emitting devices 161 may be complicatedly installed.

Therefore, the voltage supply lines and the signal transmission lines of the respective light emitting devices 161 are preferably provided to be connected to the control unit 170 through connectors 145 mounted on certain portions of the blade 140.

Through the construction of the connectors 145, the voltage supply lines and the signal transmission lines are aligned and mounted in the blade 140, thus providing advantages in that the flow of external air circulating in the blade 140 is not limited, and the maintenance of the light emitting unit 160 is facilitated.

Meanwhile, the control unit 170 individually turns on or off the light emitting devices 161 according to variation in the rotational speed of the central shaft 110 and the pitch angle of the blade 140. Data information about the image 144 is stored in advance in a data storage unit 171, so that the control unit 170 turns on or off the light emitting devices 161 on the basis of the image information stored in the data storage unit 171.

The control unit 170 recognizes the blade surfaces of respective blades 140 as a single display screen, as shown in FIG. 7, and thus individually turns on or off the light emitting devices 161 to correspond to the image 144 desired to be displayed on the blade surfaces of the blades 140.

At this time, the light emitting devices 161 may be implemented as LEDs capable of indicating various colors so as to variously represent the image 144. In order to implement the LEDs, each of the light emitting devices 161 is configured such that, as shown in FIG. 6, a Red (R) light emitting device 163, a Green (G) light emitting device 164, and a Blue (B) light emitting device 165 constitute a single pixel. The R, G and B light emitting devices 163, 164 and 165 are preferably turned on in such a way that luminance is adjusted according to variation in the magnitude of voltage applied through the voltage supply lines.

That is, the R, G and B light emitting devices 163, 164 and 165 are provided to have different resistances Ω. Therefore, when the magnitude of applied voltage is changed under the control of the control unit 170, the R, G and B light emitting devices 163, 164 and 165 are turned on to represent different colors and luminances.

Further, even if the blades 140 are rotated by fluid and the positions thereof change or even if the blades 140 are horizontally rotated by the pitch control unit 150 and then a blade pitch angle changes, the control unit 170 compensates the image data stored in the data storage unit 171 for variation in the rotational speed of the central shaft 110, variation in the pitch angle of the blades 140, and variation in the position of the central shaft 110, which are detected by the detection unit 180, thus enabling the image 144 to be displayed at desired locations on the blade surfaces of the blades 140.

That is, the control unit 170 receives the image data from the data storage unit 171, and individually turns on or off the light emitting devices 161 by synchronizing information about the rotational speed of the central shaft 110, information about the pitch angle of the blades 140 and the image data with each other.

Meanwhile, the wind turbine 100 according to the present invention generates electric energy when the rotary power of the central shaft 110 is transmitted to the electric generator. Preferably, part of the electric energy generated at this time may be used as a power source for turning on or off the light emitting devices 161.

Therefore, the wind turbine 100 according to the present invention provides advantages in that the blade surfaces of the blades 140 are used as an image display screen, thus realizing advertising effects, and in that power generated by the wind turbine 100 itself is used as a power source required to display an image, so that a separate external power supply is not necessary, thus saving electric energy.

Further, the wind turbine 100 according to the present invention is configured to vary the pitch angle of the blades 140 depending on the flow velocity and direction of fluid, so that the blades 140 are rotated even at a low flow velocity of fluid, thus not only producing electricity but also realizing advertising effects through the display of an image at the low flow velocity of fluid.

Further, when an image is displayed using the blade surfaces of the rotating blades 140 as described above, the image can be displayed in all directions of 360 degrees of a circumference formed while the blades 140 are rotating, as shown in FIG. 7.

Here, the wind turbine 100 according to the present invention is preferably configured to have a multi-screen function in such a way that all the directions of the circumference are divided into three parts under the control of the control unit 170, and the screen of the image formed by the blade surfaces of the blades 140 is divided into three parts, and thus different images are displayed on the screens of the respective divisions.

That is, each of the three screens may have a size covering 120 degrees of the circumference. It is apparent that how many divisions of the circumference are formed may be selectively changed by the user according to the purpose of the display and the installation location of the wind turbine. For example, two or four divisions may be formed.

However, when the flow of fluid does not absolutely occur, that is, when wind does not blow or when a current flow velocity is lower than a lower limit of wind velocity at which the blades 140 can be rotated, the blades 140 do not rotate even if the pitch angle of the blades 140 is adjusted, thus preventing electricity from being produced, or an image from being displayed.

Therefore, the wind turbine 100 according to the present invention further includes a storage battery (not shown) for storing electricity produced by the rotation of the central shaft 110, thus enabling the voltage of the storage battery or external voltage to be supplied to the electrical generator (not shown). Accordingly, when the blades 140 are not rotated by the flow of the fluid, the wind turbine applies the voltage of the storage battery or external voltage to the electric generator while preventing the electric generator from functioning as a power generator by controlling the electrical generator, thus driving the electric generator to rotate the central shaft 110. As a result, the blades 140 can be rotated at a rotational speed (RPM) sufficient to display the image 144 on the blade surfaces of the blades 140.

Next, a second embodiment of a wind turbine according to the present invention will be described in detail with reference to FIGS. 4 to 15.

Figure 8:
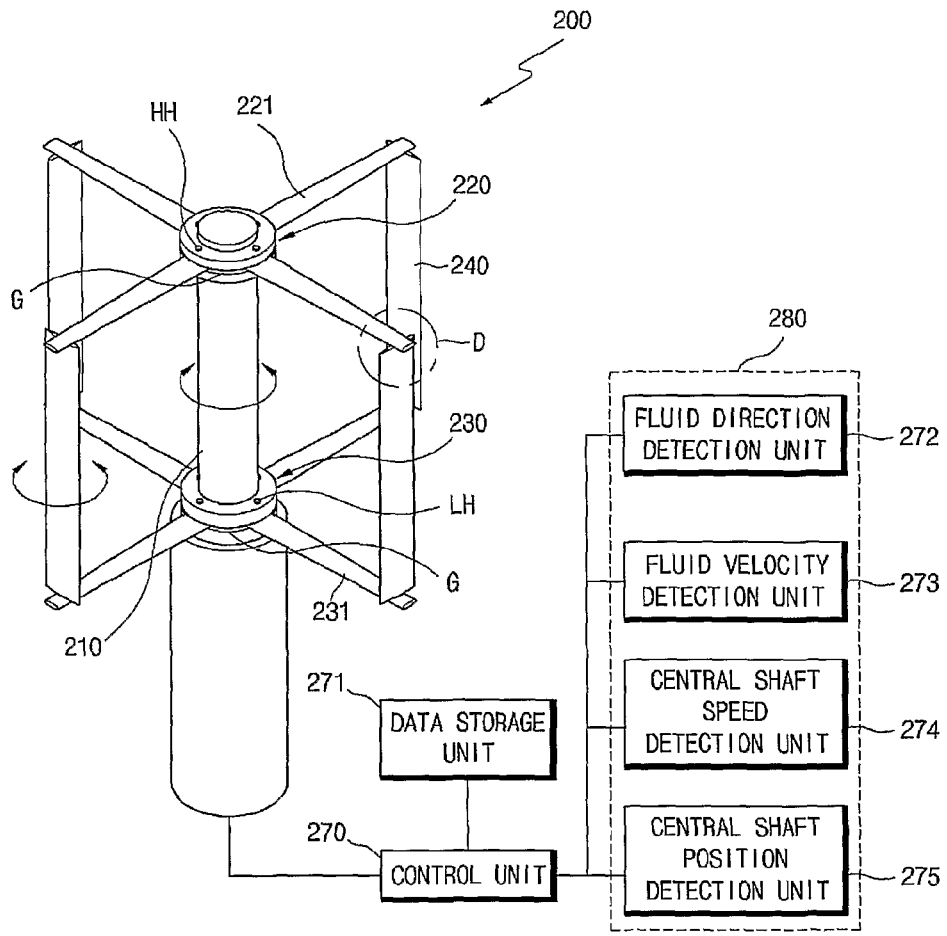
FIG. 8 is a perspective view showing the construction of a wind turbine according to a second embodiment of the present invention.
Figure 9:
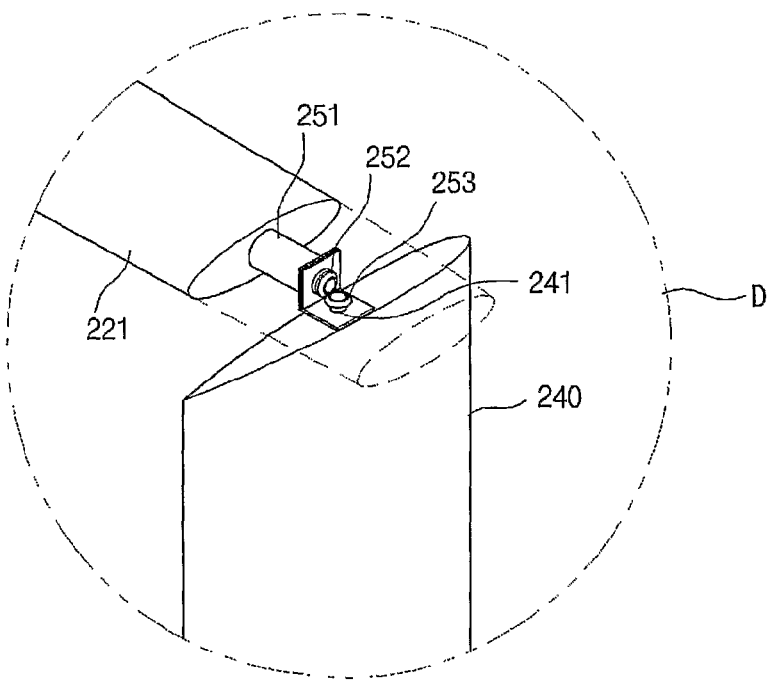
FIG. 9 is an enlarged perspective view of portion 'D' of FIG. 8.
Figure 13:
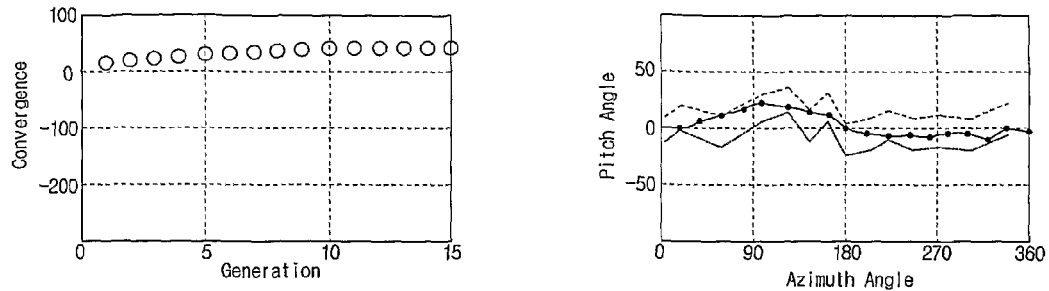
Figure 14:
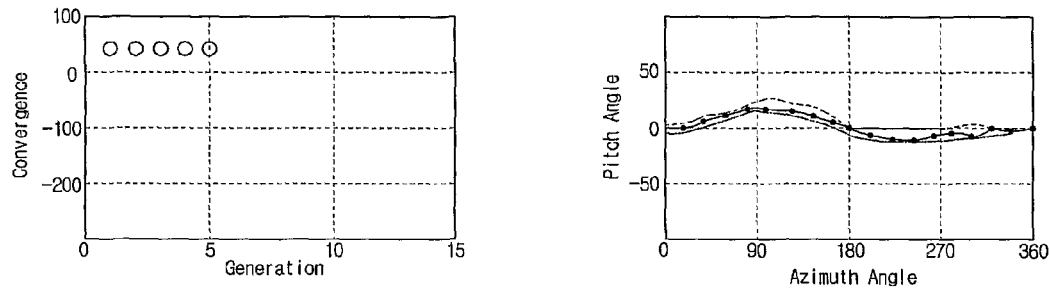
Figure 15:
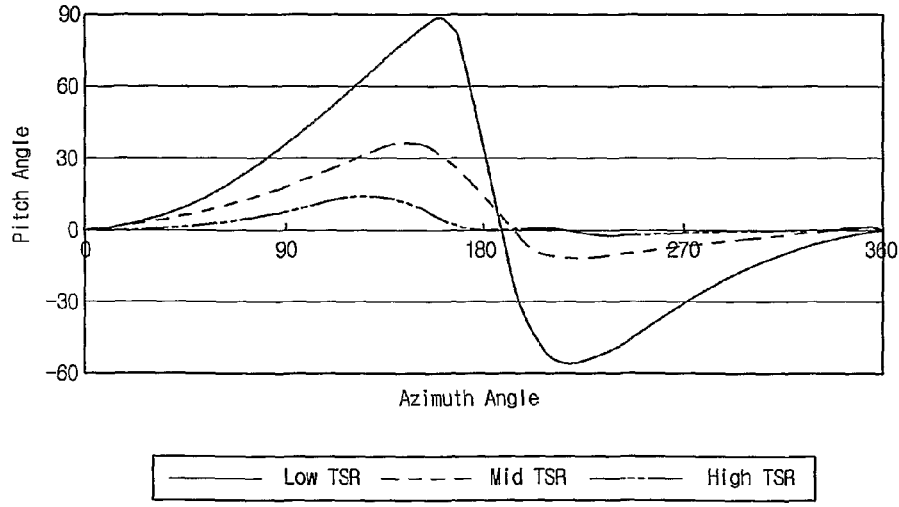
FIG. 15 is a graph showing an example of blade pitch angles calculated by a blade pitch angle determination method according to a second embodiment of the present invention.

FIG. 8 is a perspective view showing the construction of a wind turbine according to a second embodiment of the present invention, FIG. 9 is an enlarged perspective view of portion 'D' of FIG. 8, FIG. 10 is a schematic diagram showing a blade pitch angle relative to the flow of fluid according to the present invention, FIGS. 11 to 14 are graphs showing a process in which blade pitch angles converge, and FIG. 15 is a graph showing an example of blade pitch angles calculated by a blade pitch angle determination method according to a second embodiment of the present invention.

As shown in FIGS. 4 to 15, the wind turbine 200 according to the second embodiment of the present invention includes a central shaft 210, an upper hub 220, a lower hub 230, a plurality of blades 240, a pitch control unit 250, a data storage unit 271, a detection unit 280, a light emitting unit 260, and a control unit 270. The central shaft 210 is arranged vertically to the flow direction of fluid and configured to transmit rotary power to an electric generator (not shown). The upper hub 220 is provided on the top of the central shaft 210 and constructed such that a plurality of radially extending upper spokes 221 is coupled to the upper hub 220. The lower hub 230 is provided on the bottom of the central shaft 210 and constructed such that a plurality of radially extending lower spokes 231 is coupled to the lower hub 230. The blades 240 are configured such that the first ends thereof are rotatably connected to an end portion of the upper hub 220 and the second ends thereof are rotatably connected to an end portion of the lower hub 230. The pitch control unit 250 controls the pitch angle of the blades 240 by horizontally rotating the blades 240. The data storage unit 271 stores therein optimal pitch angles of the blades 240. The detection unit 280 includes a fluid direction detection unit 272 for detecting the flow direction of fluid, a fluid velocity detection unit 273 for detecting the flow velocity of the fluid, a central shaft speed detection unit 274 for detecting the rotational speed of the central shaft 210, and a central shaft position detection unit 275 for detecting the rotating position of the central shaft 210. The light emitting unit 260 includes a printed circuit board 262 provided in one blade surface of each of the blades 240, and a plurality of light emitting devices 261 mounted on the top surface of the printed circuit board 262. The control unit 270 receives the optimal pitch angles of the blades 240 stored in the data storage unit 271, operates the pitch control unit 250 to allow the blades 240 to be located at the optimal pitch angles, and individually turns on or off the plurality of light emitting devices 261 depending on variation in the rotational speed of the central shaft 210 and the pitch angle of the blades 240.

The central shaft 210 is arranged vertically to the flow direction of fluid and is configured to transmit rotary power to an electric generator (not shown).

The electric generator may be a typical power generator and may be merely arranged to provide the rotary power provided by the central shaft 210 without especially changing the direction of the rotary power. Further, a power transmission means such as a gear or a belt may be interposed between the electric generator and the central shaft 210, and a typical power cutoff means for preventing the overload of the electric generator may be disposed therebetween.

The central shaft 210 is preferably formed in a hollow cylindrical shape. The central shaft 210, cylindrically formed in this way, is stable in the structure thereof, and increases rotary power produced by the blades 240 located around the cylinder of the central shaft 210 by increasing the velocity of fluid passing through space around the cylinder of the central shaft 210 with respect to the flow direction of fluid.

Further, the upper hub 220 is provided on the top of the central shaft 210 in a shape in which the plurality of upper spokes 221 extends radially, and the lower hub 230 is provided on the bottom of the central shaft 210 in a shape in which the plurality of lower spokes 231 extends radially.

Further, the upper spokes 221 are rotatably coupled to the upper hub 220 at regular intervals. That is, the upper hub 220 is coupled to the upper spokes 221 through upper hinge axes HH.

At this time, a stopper (not shown), for fixing the upper spokes 221 to the upper hub 220 by limiting the rotation of the upper hinge axes HH when the wind turbine 200 is operated, may be provided in the upper hub 220.

Further, the lower spokes 231 are rotatably coupled to the lower hub 230 at regular intervals. That is, the lower hub 230 is coupled to the lower spokes 231 through lower hinge axes LH.

At this time, a stopper (not shown), for fixing the lower spokes 231 to the lower hub 230 by limiting the rotation of the lower hinge axes LH when the wind turbine 200 is operated, may be provided in the lower hub 230.

In the upper hub 220 and the lower hub 230, holes G required to rotate the upper spokes 221 and the lower spokes 231 are formed.

The blades 240 are rotatably formed around the shafts 241. Upper portions of the shafts 241 are rotatably coupled to the upper spokes 221 of the upper hub 220 and lower portions thereof are rotatably coupled to the lower spokes 231 of the lower hub 230.

As shown in FIG. 4, both ends of the blade 240 are formed to be open so that both the ends communicate with each other, and the inner surface of the blade 240 is supported by a spar 243, and thus the shape of the blade 240 is maintained.

Further, at one end of the shaft 241b of the blade 240, a shaft support 242, which is inserted into holes 246 formed at both ends of the blade and is configured to couple the blade 240 to the shaft 241b, is formed.

In this way, since both ends of the blade 240 are formed to be open, external air is circulated into the blade 240 through the holes 246, and thus the effect of cooling the light emitting unit 260 heated by the repeated turning on/off operations of the light emitting devices 261 is provided. In addition, since the blade 240 is formed to have an empty inner space, the weight of the blade 240 is reduced, and thus the effect of increasing the rotating efficiency thereof attributable to fluid is provided.

Here, a cooling part (not shown) may be further provided in the blade 240 to cool the light emitting unit 260, heated by the repeated turning on/off operations of the light emitting devices 261, when heat generated by the light emitting unit 260 exceeds a possible level of cooling by external air flowing into the blade through the holes 246.

As shown in FIG. 9, the pitch control unit 250 includes a servo motor 251 placed at the end of each upper spoke 221 and rotated under the control of the control unit 270, a servo motor gear 252 connected to the shaft of the servo motor 251, and a blade gear 253 connected to the shaft 241 of the blade 240 and provided to be engaged with the servo motor gear 252.

The servo motor gear 252 and the blade gear 253 are preferably formed in the shape of bevel gears.

Therefore, the pitch control unit 250 transmits the rotary power of the servo motor 251 to the shaft 241 due to the engagement between the blade gear 253 and the servo motor gear 252, thus changing the pitch angle of the blade 240.

At this time, the pitch angle of the blade 240 is adjusted by the operation of the shaft 241 which is rotating in a horizontal direction due to the rotary power of the servo motor 251.

Here, as shown in FIG. 10, the pitch angle of the blade 240 means an angle formed by a solid line, indicating a tangential direction of a circumference formed while the end portions of the upper spokes 221 and the lower spokes 231 are rotating, and the blade surface of the blade 240.

The pitch control unit 250 is operated by the control unit 270 and controls the pitch angle of the blade 240 to obtain optimal efficiency.

Here, the control unit 270 may control the servo motor 251 by transmitting a pulse-shaped control signal to the pitch control unit 250. The servo motor 251 is configured to be rotated by a certain angle for every input pulse and to perform location control for the rotation angle of the servo motor 251 by varying the frequency of the pulse.

The optimal pitch angles of the blade 240 are stored in the data storage unit 271. The control unit 270 drives the servo motor 251 by selecting a blade pitch angle enabling optimal efficiency to be obtained depending on the flow direction and flow velocity of fluid and the rotational speed of the central shaft 210.

The pitch angle of the blade 240 stored in the data storage unit 271 is described in detail with reference to a method of determining the blade pitch angle of the wind turbine, which will be described later.

As described above, the wind turbine 200 according to the present invention is advantageous in that optimal energy conversion efficiency can be realized by actively changing the pitch angle of the blade 240 depending on variation in externally flowing fluid.

Furthermore, as shown in FIG. 8, the detection unit 280 includes the fluid direction detection unit 272 for detecting the flow direction of fluid, the fluid velocity detection unit 273 for detecting the flow velocity of the fluid, the central shaft speed detection unit 274 for detecting the rotational speed of the central shaft 210, and the central shaft position detection unit 275 for detecting the rotating position of the central shaft 210.

In this case, the rotating position of the central shaft 210 detected by the central shaft position detection unit 275 denotes a position at which a specific point located on the outer circumference of the central shaft 210 is placed when the central shaft 210 is rotating in the case where the specific point is located on the outer circumference of the central shaft 210. That is, it means one position, at which the specific point is placed, among a plurality of positions corresponding to azimuth angles of 360 degrees formed by the outer circumference of the central shaft 210.

Further, the detection unit 280 is equipped with typical sensors having fans to detect the rotational speed and direction of the blades relative to the velocity of fluid, that is, wind, thus detecting the flow velocity and direction of the fluid.

Here, a flow direction meter, which is generally and widely used, may be used as the fluid direction detection unit 272, and a velocity meter may be used as the fluid velocity detection unit 273, but the present invention is not limited to the flow direction meter and the velocity meter.

The control unit 270 selects an optimal blade pitch angle suitable for the detected direction and velocity of fluid and the speed of the shaft from the data storage unit 271, and then drives the servo motor 251 so that the blades 240 can maintain optimal pitch angles at respective rotating positions.

In this way, the wind turbine 200 of the present invention detects variation in the flow of fluid and the rotation of the central shaft 210, and maintains the pitch angle of the blade 240 enabling optimal efficiency to be obtained in each situation, and thus there is an advantage in that energy conversion efficiency can be remarkably improved.

Next, a method of determining the pitch angle of the blade 240 of the wind turbine 200 is described below.

First, at step a), the wind turbine 200 selects a plurality of arbitrary azimuth angles at regular intervals around the central shaft 210, and selects arbitrary pitch angles of the blade 240 from among the arbitrary azimuth angles.

That is, the blade 240 is oriented at azimuth angles of 360 degrees around the central shaft 210 while the wind turbine 200 is rotating. A plurality of arbitrary azimuth angles is selected from among the azimuth angles at regular intervals, and the pitch angles of the blade 240 located at the selected azimuth angles are arbitrarily selected.

At step b), the pitch angles of the blades 240 at the azimuth angles selected at step a) are linearly connected to each other, and thus the pitch angles of the blade 240 are determined at azimuth angles other than the selected azimuth angles.

Figure 11:
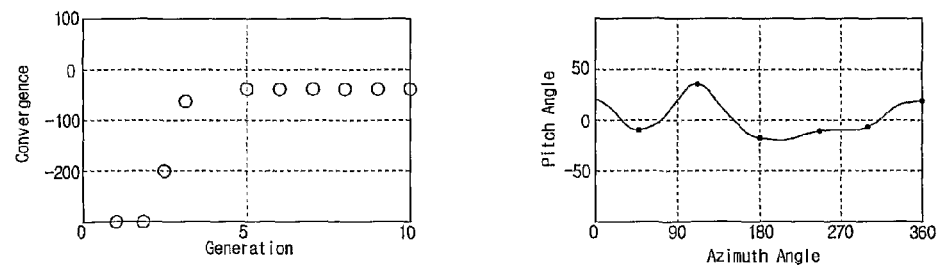
FIGS. 11 to 14 are graphs showing a process in which blade pitch angles converge.

As shown in FIG. 11, the pitch angles of the blades 240 at the arbitrarily selected azimuth angles are arbitrarily selected, and the blades 240 are allowed to have similar pitch angles at adjacent azimuth angles, thus enabling the blade pitch angles to be selected at respective azimuth angles.

Further, at step c), the output of the wind turbine 100 is calculated at a predetermined fluid velocity and a predetermined central shaft rotational speed. As a method of calculating the output of the wind turbine 200, an automatic grid generation technique may be preferably used.

When analysis is performed while design parameters or the like are changed, different grid models must be generated for respective situations. Such an automatic grid generation technique is a technique capable of creating this process as a kind of macro and automatically executing the process.

Further, for grid generation and analysis, MSC. PATRAN (produced by MSC Software Corporation, www.mscsoftware.com) and STAR-CD (produced by CD-adapco www.cd-adapco.com), which are commercial software programs, may be used.

Next, at step d), the pitch angle of the blade 240, at which the output of the wind turbine 200 is maximized, is selected by repeating steps a) to c). At step d), the predetermined fluid velocity and the central shaft rotational speed are not changed while steps a) to c) are repeated.

That is, the output of the wind turbine 200 is repeatedly calculated while the pitch angle of the blade 240 is arbitrarily changed at the uniform flow velocity of fluid and the uniform rotational speed of the central shaft. The pitch angle of the blade 240, at which the output of the wind turbine 200 is maximized among the calculated output values, is selected.

In this way, since the arbitrary pitch angles of the blade 240 are determined through the optimization algorithm at step a), the arbitrary pitch angles of the blade are approximate to a pitch angle having optimal efficiency as the number of repetitions of steps a) to c) increases.

Figure 12:
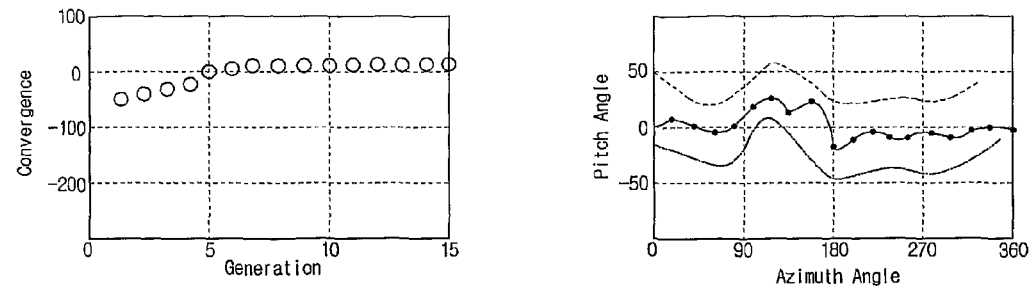

FIG. 12 is a graph showing the selection of the pitch angle of the blade 240 at the highest output from among various pitch angles of the blade 240.

Next, step e), from a range narrower than that of the pitch angles of the blade 240 which have been arbitrarily selected at step a), arbitrary pitch angles of the blade 240 are selected on the basis of the pitch angle of the blade 240 selected at step d).

Next, at step f), the arbitrary blade pitch angles are caused to converge on the pitch angle of the blade 240, at which the wind turbine 200 can obtain the highest output at the predetermined fluid velocity and the predetermined central shaft rotational speed, by repeating steps b) to e).

FIGS. 13 and 14 are graphs showing the convergence of the pitch angles of the blades 240 realized by repeating steps b) to e).

Next, at step g), the pitch angles of the blade 240 converging at step f) are stored in the data storage unit 270.

At step h), the predetermined fluid velocity and the predetermined central shaft rotational speed used at step c) are changed to other values.

Finally, at step i), the optimal pitch angles of the blades 240 corresponding to various fluid velocities and various central shaft rotational speeds are stored in the data storage unit 271 and are arranged into a Database (DB), by repeating steps a) to h).

FIG. 15 is a graph showing an example of the pitch angles of the blades 240 calculated through the above steps. In FIG. 15, the term 'Tip Speed Ratio (TSR)' means a value obtained by dividing the linear velocity of the blades 240 by the fluid velocity.

That is, low TSR means the case where the linear velocity of the blades 240 is lower than the velocity of fluid and high TSR means the case where the linear velocity of the blades 240 is higher than the velocity of the fluid.

As shown in FIG. 15, it can be seen that, when the linear velocity of the blades 240 is low, variation in the pitch angle of the blades 240 at each azimuth angle is large, whereas when the linear velocity of the blade 240 is high, variation in the pitch angle of the blade 240 at each azimuth angle is small.

That is, the fact that the wind turbine 200 obtains rotary power based on a drag in an initial period during which the linear velocity of the blades 240 is low, and obtains rotary power based on a lift as the linear velocity of the blades 240 becomes higher indicates that energy conversion efficiency is high.

As described above, the method of determining the blade pitch angles of the wind turbine 200 according to the present invention is advantageous in that the pitch angles of the blades 240, enabling optimal energy conversion efficiency to be obtained according to the flow of various types of fluid, can be calculated.

Meanwhile, referring to FIGS. 4 to 7, the wind turbine 200 according to the second embodiment of the present invention is configured to display an image 244, such as a picture or a moving image, according to the afterimage effects of persons using the blade surfaces of the blades 240.

In order to implement this display function, the wind turbine 200 further includes the light emitting unit 260 including the printed circuit board 262 provided on one blade surface of each blade 240, and the plurality of light emitting devices 261 mounted on the top surface of the printed circuit board 262. As the light emitting devices 261, typical Light Emitting Diodes (LEDs) may be used.

Generally, human eyes perceive image frames, which repeatedly appear at higher than a certain speed as in the case of a movie, as a continuous object. For example, when a red point moving from location A to location B at a certain speed is turned on and off, a human being's eyes perceive that the red point is continuously turned on in an interval ranging from location A to location B.

Similarly, when the light emitting devices 261 located on the blade surface of the blade 240 which is rotating in a horizontal direction by way of fluid are turned on and off in a certain pattern, it seems that the blade surfaces of respective blades 240 display a predetermined image 244, as shown in FIG. 7.

Here, it is apparent that the number of light emitting devices 261 may vary according to display resolution and the size of the blades 240. Further, in FIGS. 4 and 5, the light emitting devices 261 of the light emitting unit 260 are shown to be arranged in one line, but they are not limited to this arrangement and may be arranged in two or more lines in consideration of the display resolution and the rotational speed of the central shaft 210.

Further, as shown in FIG. 5, a plurality of light emitting devices 261 may be provided on one blade surface of the blade 240. In this case, in a portion below the light emitting devices 261, that is, the inner portion of the one blade surface of the blade 240 on which the light emitting devices 261 are mounted, voltage supply lines (not shown) required to supply voltage to the light emitting devices 261 and signal transmission lines (not shown) required to control the light emitting devices 261 may be complicatedly installed.

Therefore, the voltage supply lines and the signal transmission lines of the respective light emitting devices 261 are preferably provided to be connected to the control unit 270 through connectors 245 mounted on certain portions of the blade 240.

Through the construction of the connectors 245, the voltage supply lines and the signal transmission lines are aligned and mounted in the blade 240, thus providing advantages in that the flow of external air circulating in the blade 240 is not limited, and the maintenance of the light emitting unit 260 is facilitated.

Meanwhile, the control unit 270 individually turns on or off the light emitting devices 261 according to variation in the rotational speed of the central shaft 210 and the pitch angle of the blade 240. Data information about the image 244 is stored in advance in a data storage unit 271, so that the control unit 270 turns on or off the light emitting devices 261 on the basis of the image information stored in the data storage unit 271.

The control unit 270 recognizes the blade surfaces of respective blades 240 as a single display screen, as shown in FIG. 7, and thus preferably individually turns on or off the light emitting devices 261 to correspond to the image 244 desired to be displayed on the blade surfaces of the blades 240.

At this time, the light emitting devices 261 may be implemented as LEDs capable of indicating various colors so as to variously represent the image 244. In order to implement the LEDs, each of the light emitting devices 261 is configured such that, as shown in FIG. 6, a Red (R) light emitting device 263, a Green (G) light emitting device 264, and a Blue (B) light emitting device 265 constitute a single pixel. The R, G and B light emitting devices 263, 264 and 265 are preferably turned on in such a way that luminance is adjusted according to variation in the magnitude of voltage applied through the voltage supply lines.

That is, the R, G and B light emitting devices 263, 264 and 265 are provided to have different resistances Ω. Therefore, when the magnitude of applied voltage is changed under the control of the control unit 270, the R, G and B light emitting devices 263, 264 and 265 are turned on to represent different colors and luminances.

Further, even if the blades 240 are rotated by fluid and the positions thereof are changed or even if the blades 240 are horizontally rotated by the servo motor 251 and the pitch angle thereof is changed, the control unit 270 compensates the image data stored in the data storage unit 271 for variation in the rotational speed of the central shaft 110, variation in the pitch angle of the blades 240, and variation in the position of the central shaft 210, which are detected by the detection unit 280, thus enabling the image 244 to be displayed at desired locations on the blade surfaces of the blades 240.

That is, the control unit 270 receives the image data from the data storage unit 271, and individually turns on or off the light emitting devices 261 by synchronizing information about the rotational speed of the central shaft 210, information about the pitch angle of the blades 240 and the image data with each other.

Meanwhile, the wind turbine 200 according to the present invention generates electric energy when the rotary power of the central shaft 210 is transmitted to the electric generator. Preferably, part of the electric energy generated at this time may be used as a power source for turning on or off the light emitting devices 261.

Therefore, the wind turbine 200 according to the present invention provides advantages in that the blade surfaces of the blades 240 are used as an image display screen, thus realizing advertising effects, and in that power generated by the wind turbine 200 itself is used as a power source required to display an image, so that a separate external power supply is not necessary, thus saving electric energy.

Further, the wind turbine 200 according to the present invention is configured to vary the pitch angle of the blades 240 depending on the flow velocity and direction of fluid, so that the blades 240 are rotated even at a low flow velocity of fluid, thus not only producing electricity but also realizing advertising effects through the display of an image at the low flow velocity of fluid.

Further, when an image is displayed using the blade surfaces of the rotating blades 140 as described above, the image can be displayed in all directions of 360 degrees of a circumference formed while the blades 140 are rotating, as shown in FIG. 7.

Here, the wind turbine 200 according to the present invention is preferably configured to have a multi-screen function in such a way that all the directions of the circumference are divided into three parts under the control of the control unit 270, and the screen of the image formed by the blade surfaces of the blades 240 is divided into three parts, and thus different images are displayed on the screens of the respective divisions.

That is, each of the three screens may have a size covering 120 degrees of the circumference. It is apparent that how many divisions of the circumference are formed may be selectively changed by the user according to the purpose of the display and the installation location of the wind turbine. For example, two or four divisions may be formed.

However, when the flow of fluid does not absolutely occur, that is, when wind does not blow or when a current flow velocity is lower than a lower limit of wind velocity at which the blades 240 can be rotated, the blades 240 do not rotate even if the pitch angle of the blades 240 is adjusted, thus preventing electricity from being produced, or an image from being displayed.

Therefore, the wind turbine 200 of the present invention further includes a storage battery (not shown) for storing produced electricity or adopts a structure for receiving external electricity, and also enables a separate motor capable of driving the central shaft 210 to be mounted, thus preventing the operation of the electric generator and driving the motor using the storage battery when the flow of fluid does not occur. Accordingly, the blades 240 can be rotated at a rotational speed (RPM) sufficient to display an image.

Therefore, the wind turbine 200 according to the present invention further includes the storage battery (not shown) for storing electricity produced by the rotation of the central shaft 210, thus enabling the voltage of the storage battery or external voltage to be supplied to the electrical generator (not shown). Accordingly, when the blades 240 are not rotated by the flow of the fluid, the wind turbine applies the voltage of the storage battery or external voltage to the electric generator while preventing the electric generator from functioning as a power generator by controlling the electrical generator, thus driving the electric generator to rotate the central shaft 210. As a result, the blades 240 can be rotated at a rotational speed (RPM) sufficient to display the image 244 on blade surfaces of the blades 240.

INDUSTRIAL APPLICABILITY

As described above, a displayable wind turbine according to the present invention is advantageous in that, since the pitch angle of blades can be automatically adjusted depending on the flow direction and flow velocity of fluid, optimal energy conversion efficiency can be obtained even if the direction and velocity of flowing fluid are changed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A displayable wind turbine, comprising:
a central shaft arranged vertically to a flow direction of fluid to transmit rotary power to an electric generator;
an upper hub provided on a top of the central shaft and configured such that a plurality of radially extending upper spokes is coupled to the upper hub;
a lower hub provided on a bottom of the central shaft and configured such that a plurality of radially extending lower spokes is coupled to the lower hub;
a plurality of blades, first ends of which are rotatably connected to an end portion of the upper hub and second ends of which are rotatably connected to an end portion of the lower hub;
a pitch control unit configured to adjust a pitch angle of the blades by horizontally rotating the blades;
a detection unit including a fluid direction detection unit for detecting a flow direction of the fluid, a fluid velocity detection unit for detecting a flow velocity of the fluid, a central shaft speed detection unit for detecting a rotational speed of the central shaft, and a central shaft position detection unit for detecting a rotating position of the central shaft;
a light emitting unit including a printed circuit board provided on one blade surface of each of the blades and a plurality of light emitting devices mounted on a top surface of the printed circuit board; and
a control unit configured to control operations of the pitch control unit and the light emitting unit and to individually turn on or off the light emitting devices depending on variation in the rotational speed of the central shaft and the pitch angle of the blades.

2. The displayable wind turbine according to claim 1, wherein the pitch control unit comprises:
a plurality of connection elements, first ends of which are connected to a fastening part installed to be spaced apart from a shaft of each of the blades in a width direction of the blade by a predetermined distance (d);
a rotating body connected to second ends of the plurality of connection elements and configured to be rotated together with the upper hub around a center of the central shaft as a reference location;
a guiding part for linearly guiding the rotating body; and
a direction switching part configured to vary a magnitude of the pitch angle of the blades in a shape of a sine wave through the connection elements connected to the rotating body by translating and rotating the center of the rotating body from the reference location, thus rotating the guiding part.

3. The displayable wind turbine according to claim 1, further comprising driving means configured to drive the pitch control unit and provided with an operation unit for supplying activation force to the pitch control unit on a basis of information detected by the detection unit.

4. The displayable wind turbine according to claim 1, wherein each of the plurality of light emitting devices is configured such that a R(Red) light emitting device, a G(Green) light emitting device and a B(Blue) light emitting device constitute a single pixel, and the R, G and B light emitting devices are operated to adjust luminance or to be turned on or off according to variation in a magnitude of input voltage.

5. The displayable wind turbine according to claim 1, further comprising a data storage unit for storing image data to be displayed on blade surfaces of the blades,
wherein the control unit receives the image data from the data storage unit, and individually turns on or off the light emitting devices by synchronizing information about the rotational speed of the central shaft, information about the pitch angle of the blades and the image data with each other.

6. The displayable wind turbine according to claim 5, wherein the blades are configured such that both ends thereof are formed to be open.

7. The displayable wind turbine according to claim 5, further comprising a cooling part provided in each of the blades and configured to cool the light emitting unit heated by repeated turning on/off operations of the light emitting devices.

8. A displayable wind turbine, comprising:
a central shaft arranged vertically to a flow direction of fluid to transmit rotary power to an electric generator;
an upper hub provided on a top of the central shaft and configured such that a plurality of radially extending upper spokes is coupled to the upper hub;
a lower hub provided on a bottom of the central shaft and configured such that a plurality of radially extending lower spokes is coupled to the lower hub;
a plurality of blades, first ends of which are rotatably connected to an end portion of the upper hub and second ends of which are rotatably connected to an end portion of the lower hub;
a pitch control unit configured to adjust a pitch angle of the blades by horizontally rotating the blades;
a data storage unit configured to store optimal pitch angles of the blades;
a detection unit including a fluid direction detection unit for detecting a flow direction of the fluid, a fluid velocity detection unit for detecting a flow velocity of the fluid, a central shaft speed detection unit for detecting a rotational speed of the central shaft, and a central shaft position detection unit for detecting a rotating position of the central shaft;
a light emitting unit including a printed circuit board provided on one blade surface of each of the blades and a plurality of light emitting devices mounted on a top surface of the printed circuit board; and
a control unit configured to receive the optimal pitch angles of the blades stored in the data storage unit, to operate the pitch control unit so that the blades are located at the optimal pitch angles, and to individually turn on or off the light emitting devices depending on variation in the rotational speed of the central shaft and the pitch angle of the blades.

9. The displayable wind turbine according to claim 8, wherein the pitch control unit comprises:
a servo motor located at an end of the upper hub and configured to be rotated under control of the control unit;
a servo motor gear connected to a shaft of the servo motor; and
a blade gear connected to a shaft of each blade and engaged with the servo motor gear, wherein the pitch angle of the blades is adjusted in such a way that the blade gear is rotated together with rotation of the servo motor.

10. The displayable wind turbine according to claim 8, wherein the data storage unit stores image data to be displayed on blade surfaces of the blades, and
the control unit receives the image data from the data storage unit, and individually turns on or off the light emitting devices by synchronizing information about the rotational speed of the central shaft, information about the pitch angle of the blades and the image data with each other.

11. The displayable wind turbine according to claim 10, wherein each of the plurality of light emitting devices is configured such that a R(Red) light emitting device, a G(Green) light emitting device and a B(Blue) light emitting device constitute a single pixel, and the R, G and B light emitting devices are operated to adjust luminance or to be turned on or off according to variation in a magnitude of input voltage.

12. The displayable wind turbine according to claim 10, wherein the blades are configured such that both ends thereof are formed to be open.

13. The displayable wind turbine according to claim 10, further comprising a cooling part provided in each of the blades and configured to cool the light emitting unit heated by repeated turning on/off operations of the light emitting devices.

14. The displayable wind turbine according to claim 2, further comprising driving means configured to drive the pitch control unit and provided with an operation unit for supplying activation force to the pitch control unit on a basis of information detected by the detection unit.

15. The displayable wind turbine according to claim 4, further comprising a data storage unit for storing image data to be displayed on blade surfaces of the blades,
wherein the control unit receives the image data from the data storage unit, and individually turns on or off the light emitting devices by synchronizing information about the rotational speed of the central shaft, information about the pitch angle of the blades and the image data with each other.

16. The displayable wind turbine according to claim 15, wherein the blades are configured such that both ends thereof are formed to be open.

17. The displayable wind turbine according to claim 15, further comprising a cooling part provided in each of the blades and configured to cool the light emitting unit heated by repeated turning on/off operations of the light emitting devices.

18. The displayable wind turbine according to claim 9, wherein the data storage unit stores image data to be displayed on blade surfaces of the blades, and
the control unit receives the image data from the data storage unit, and individually turns on or off the light emitting devices by synchronizing information about the rotational speed of the central shaft, information about the pitch angle of the blades and the image data with each other.

19. The displayable wind turbine according to claim 18, wherein each of the plurality of light emitting devices is configured such that a R(Red) light emitting device, a G(Green) light emitting device and a B(Blue) light emitting device constitute a single pixel, and the R, G and B light emitting devices are operated to adjust luminance or to be turned on or off according to variation in a magnitude of input voltage.

20. The displayable wind turbine according to claim 18, wherein the blades are configured such that both ends thereof are formed to be open.

21. The displayable wind turbine according to claim 18, further comprising a cooling part provided in each of the blades and configured to cool the light emitting unit heated by repeated turning on/off operations of the light emitting devices.

* * * * *